Figure 1:
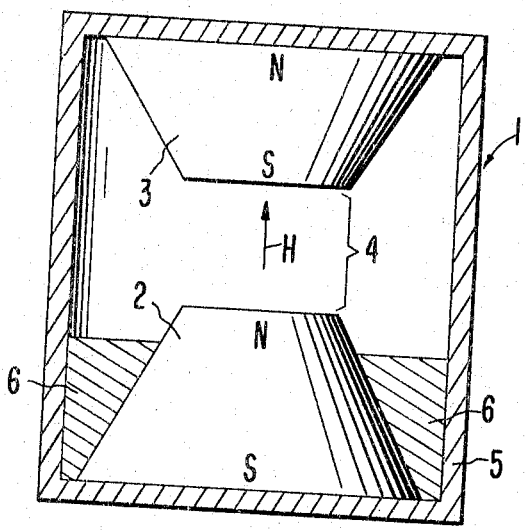

June 13, 1967  E. J. COOK  3,325,758
NEGATIVE TEMPERATURE COEFFICIENT SHUNT MEANS
FOR MAGNETIC STRUCTURES
Filed Dec. 8, 1965

2 Sheets-Sheet 1

INVENTOR.
EDWARD J. COOK
BY
*Harry E. Aine*
ATTORNEY

INVENTOR.
EDWARD J. COOK
BY
Harry E. ...
ATTORNEY

United States Patent Office 3,325,758
Patented June 13, 1967

3,325,758
NEGATIVE TEMPERATURE COEFFICIENT SHUNT MEANS FOR MAGNETIC STRUCTURES
Edward J. Cook, South Hamilton, Mass., assignor to Varian Associates, Palo Alto, Calif., a corporation of California
Filed Dec. 8, 1965, Ser. No. 512,423
10 Claims. (Cl. 335—217)

The present invention relates in general to temperature compensated permanent magnetic circuits and more particularly to such circuits which include a pair of permanent magnets, axially spaced apart to define a magnetic gap, polarized in aiding relation, and enclosed by a magnetic permeable shielding yoke. Such magnetic circuits are especially useful, for example, for providing the axially directed magnetic field for crossed field tubes such as voltage tunable magnetrons or for providing the intense uniform polarizing magnetic field for gyromagnetic resonance spectrometers.

Heretofore bowl type permanent magnet circuits for voltage tunable magnetrons have been temperature compensated by means of a sleeve of temperature compensating material disposed around the equator of the permanent bowl magnets. Typically the temperature compensating material has been a certain type of Carpenter's steel having a negative temperature coefficient of magnetic permeability. The sleeve forms a temperature sensitive magnetic shunt which shunts less magnetic field as the magnet warms up thereby compensating for the loss of magnetization of the permanent magnet as it is heated in use. Such a prior temperature compensated magnetic circuit is shown in U.S. Patent 3,194,998 issued July 13, 1965.

Bowl magnet circuits have a substantial amount of leakage flux and consequently do not represent an optimum use of the magnetic material and thus are unduly heavy and bulky. Moreover, such flux leaky circuits create shielding problems if they are to be closely packed with other devices which may be magnetic or which are sensitive to stray flux.

A more practical magnetic circuit, for many applications, which overcomes many of the problems of the bowl circuit is a magnetic circuit, wherein a pair of spaced apart axially aligned permanent magnets are enclosed within a magnetic permeable yoke, as of soft iron, which returns the flux between the outer ends of the pair of permanent magnets. The enclosing yoke also serves as a magnetic shield for shielding the internal flux gap from extraneously produced magnetic fields. Hereinafter this latter type of magnetic circuit will be referred to as a self shielding magnetic circuit.

In the present invention, thermal compensation is provided for the self shielding magnetic circuit by providing thermally compensating shunt members shunting one or more of the internal magnets of the circuit. In a preferred embodiment of the present invention, the self shielding magnetic circuit for a voltage tunable magnetron is thermally compensated by means of a thermal compensating sleeve surrounding one of the magnets for shunting the magnet to the yoke in a thermally compensating manner. In another embodiment of the present invention the self shielding magnetic circuit for a gyromagnetic resonance spectrometer is thermally compensated by means of a thermal compensating sleeve surrounding each magnet or by a compensating member inside one or both of the magnets for shunting the magnets back on themselves.

The principal object of the present invention is the provision of a thermally compensated self shielding magnetic circuit.

One feature of the present invention is the provision of a thermal compensating member positioned to bridge flux from one part of an internal magnet of a self shielding permanent magnet circuit either to the shielding yoke or to another part of the magnet.

Another feature of the present invention is the same as the preceding feature wherein the magnets are characterized by having a low saturable flux density, such as is typical of platinum-cobalt magnets, and said compensating member bridges the magnet to the surrounding shielding yoke for shunting the magnet to the flux returning yoke whereby saturation of the permanent magnet is prevented in use.

Another feature of the present invention is the same as any one or more of the preceding features wherein the thermal compensating member substantially fills the region of space surrounding one of the internal magnets and between the magnet and the surrounding yoke whereby the shunting flux density is distributed over a substantial surface area of the magnet to prevent localized flux saturation effects.

Another feature of the present invention is the same as any one of the preceding features wherein the self shielding magnetic circuit is for a voltage tunable magnetron and wherein one of the internal magnets is larger than the other and wherein the thermal compensating member surrounds only the larger magnet whereby the magnetron's output signal performance is least perturbed by the temperature compensation.

Figure 2:
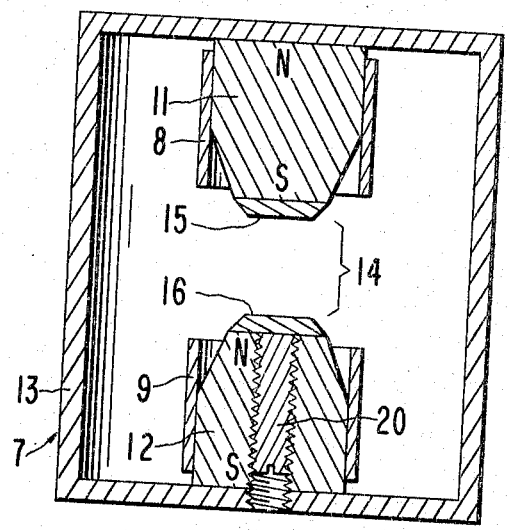
Figure 3:
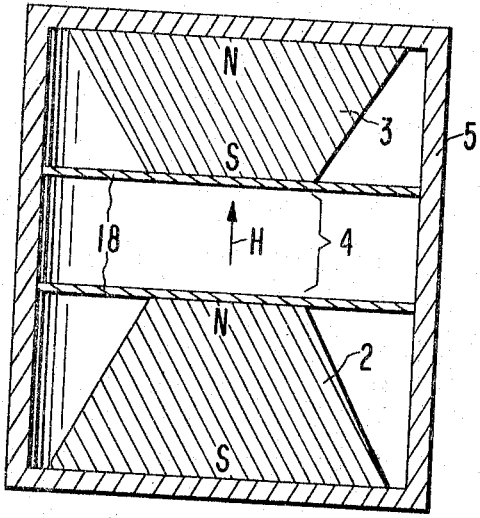
Figure 4:
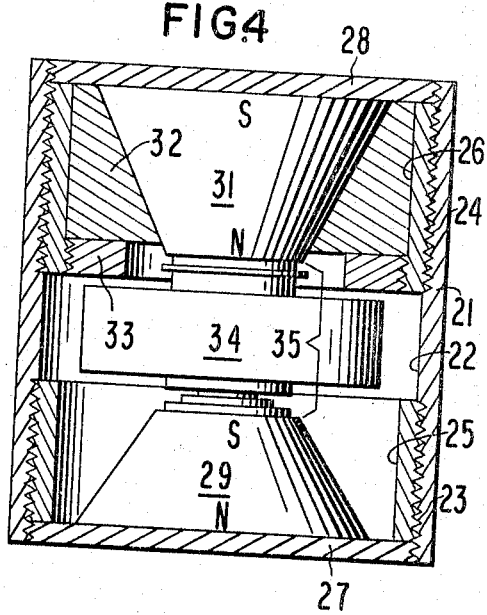
Figure 5:
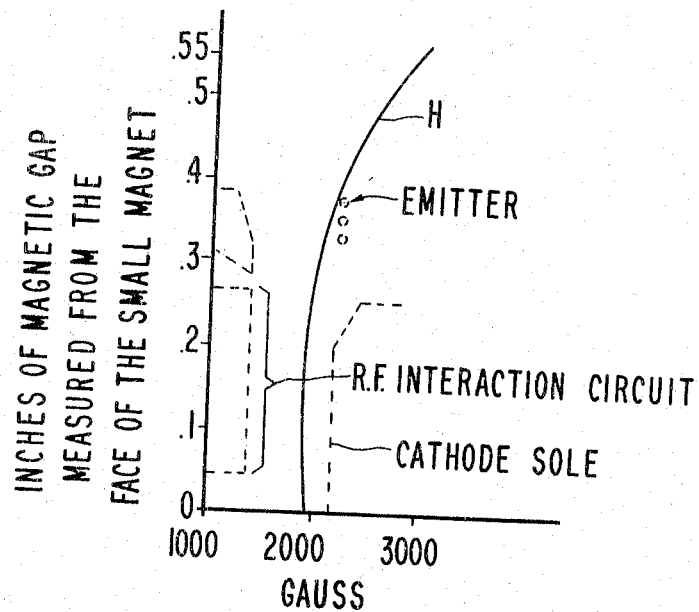
Figure 6:
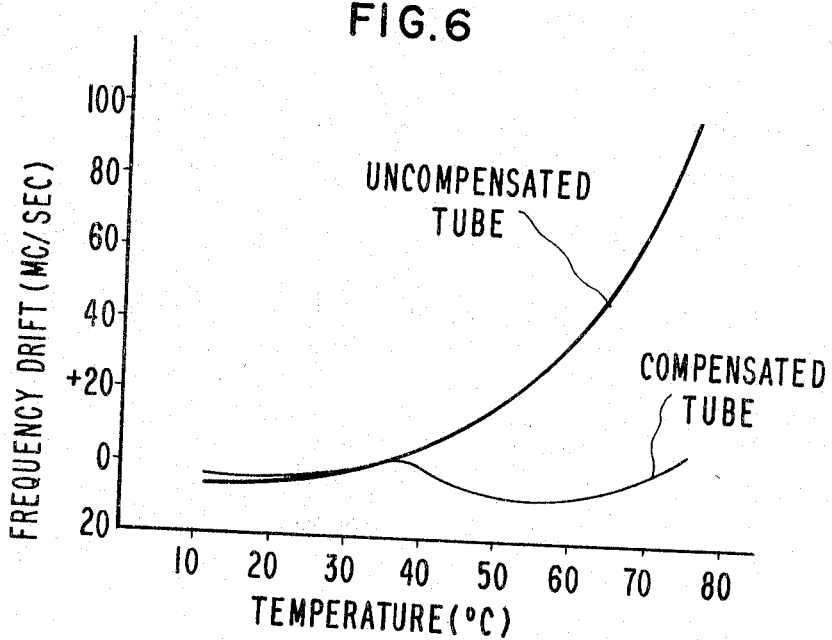

Other features and advantages of the present invention will become more apparent upon a perusal of the following specification taken in connection with the accompanying drawings wherein:

FIG. 1 is a schematic longitudinal sectional view of a self shielding magnetron permanent magnet circuit employing the temperature compensation feature of the present invention, FIG. 2 is a schematic longitudinal sectional view of a self shielding high field gyromagnetic resonance spectrometer permanent magnet circuit employing an alternative temperature compensation feature of the present invention, FIG. 3 shows an alternative temperature compensation feature of the present invention for the magnetron magnetic circuit of FIG. 1, FIG. 4 is a longitudinal view partly in section of a voltage tunable magnetron employing the temperature compensation of the present invention, FIG. 5 is a plot of distance in the gap versus magnetic field intensity for the circuit of FIG. 4, and FIG. 6 is a graph of frequency drift versus temperature for a magnetron employing the temperature compensation of the present invention.

Referring now to FIG. 1 there is shown a self shielding permanent magnet circuit 1 especially useful for a voltage tunable magnetron and employing the temperature compensation of the present invention. More particularly, the magnetic circuit comprises a pair of axially aligned spaced apart truncated cone-shaped permanent magnets 2 and 3, as of platinum-cobalt or alnico IX. The magnets 2 and 3 are polarized in magnetic field aiding relationship to produce a magnetic field intensity H of approximately 2000 gauss in the gap 4 defined by the space between the mutually opposed ends of the magnets 2 and 3.

A shielding closed cylindrical yoke 5 as of soft iron envelops the magnets 2 and 3 and provides a magnetic flux return path bewteen the remote ends of the magnets 2 and 3. The enclosing soft iron yoke 5 also serves to shield the gap from magnetic disturbances and thermal effects which are external to the yoke 5 and in addition keeps the field of the magnets 2 and 3 from extending out of the yoke to influence other nearby devices.

Thermal compensation for the magnetic circuit 1 of FIG. 1 is provided by means of an annular thermal compensating shunt member 6 having a negative magnetic permeability temperature coefficient which is greater than that of the magnet material such as, for example, Carpenter's 30 type II alloy of 30% nickel and 70% iron. The compensating member 6 fills the space between the cone-shaped permanent magnet 2 and the surrounding yoke 5 for shunting a fraction of the magnetic flux around the magnet 2 via the intermediary of the shunting member 6 and the yoke 5. The compensating member 6 is selected, dimensioned and arranged such that at the high temperature end of the operating range of temperatures to be compensated the amount of shunting action is at a minimum preferably close to zero shunting effect. Then at the low end of the operating range of temperatures the shunting effect of the shunting member is maximum and preferably equal to the gain in flux of the magnet obtained by the temperature drop. In this manner the magnetic field intensity in the gap 4 is maintained approximately constant over the operating temperature range.

In the magnetic circuit 1 of FIG. 1 the magnets 2 and 3 are specially arranged for a voltage tunable magnetron as taught in U.S. application Ser. No. 458,617 filed May 25, 1965. Briefly, a magnet 2 is disposed adjacent the emitter with a smaller magnet 3 at the other end of the tube to obtain a flared intensity of magnetic field H across the gap 4 with the high intensity region of the field H at the emitter end of the magnetron with a constant magnetic field region adjacent the r.f. interaction circuit at the other end of the magnetron. (See FIG. 5). In this arrangement, using platinum-cobalt magnets 2 and 3, the thermal compensating member is preferably located around the larger magnet 2, for reasons which will be more fully described below.

Referring now to FIG. 2 there is shown an alternative temperature compensation embodiment of the present invention wherein a self shielding permanent magnet circuit 7, especially useful for providing relatively high intensity field gaps of approximately 14,000 gauss, is temperature compensated by means of a pair of compensating shunting ring or sleeve members 8 and 9. One sleeve is disposed around each of the axially aligned permanent magnets 11 and 12 as of alnico V–7. As in the circuit 1 of FIG. 1 the temperature compensating sleeve 8 or 9 is made of Carpenter's 30 type II alloy. The specific improved embodiment of FIG. 2 forms the subject matter of a copending application Ser. No. 512,422 filed Dec. 8, 1965 and titled Negative Temperature Coefficient Means for a Magnet Structure and assigned to the same assignee as the present invention.

As in the magnetic circuit of FIG. 1, the magnets 11 and 12 are enclosed by a closed cylindrical shielding yoke 13 as of soft iron. The magnets 11 and 12 are polarized in magnetic field aiding relationship to provide a high intensity uniform magnetic field across the gap 14. A pair of truncated conical pole pieces 15 and 16 as of soft iron are carried upon the mutually opposed ends of the magnets 11 and 12 to assure a more uniform magnetic field in the gap 14 than would otherwise be obtained if the alnico V–7 magnet material extended up to the gap 14.

In the magnetic circuit of FIG. 2, typical specifications for the magnet are as follows: The permanent alnico V–7 magnets 11 and 12 are 6.5″ in length and 6.12″ in maximum diameter. The yoke 13 is 1.25″ in thickness with an outside diameter of approximately 14″. The pole caps 15 and 16 are each 1″ thick and tapered to provide a minimum diameter of 2.5″ and spaced apart to define a 0.5″ gap 14. The magnets 11 and 12 are held to the yoke 13 by means of axial bolts, not shown. The compensating sleeves are 0.040″ to 0.1″ thick and 4″ in length and extend over about ⅔ of the length of each magnet 11 and 12. The thermal compensating sleeves 8 and 9 may be bonded by a suitable adhesive to the magnets 11 and 12 or may be closely spaced apart from the magnet by, for example, a 0.125″ thick cylindrical gap.

In operation, the compensating sleeves in the circuit of FIG. 2, described above, reduced the effective temperature coefficient of the magnets from 0.014%/° C. to 0.0019%/° C. for a sleeve 0.080″ thick over a temperature range of 6° C. from 36.9° C. to 30.9° C. at 14,000 gauss in the gap 14.

An alternative temperature compensation feature is also shown in FIG. 2. More specifically, one or both of the permanent magnets 11 and 12 are axially bored to receive a magnetic permeable member or slug 20 of temperature compensating material as of Carpenter's 30 type II alloy. The slug 20 serves to provide a magnetic shunt for the magnet which is temperature sensitive and shunts more flux at flow temperature than at high temperature whereby the magnetic flux intensity in the gap is maintained more constant over the compensated temperature range. The specific slug compensator of FIG. 2 forms the subject matter of and is claimed in copending application Ser. No. 512,422, filed Dec. 8, 1965 and assigned to the same assignee as the present invention.

Referring now to FIG. 3 there is shown alternative temperature compensating arrangement of the present invention for temperature compensating self shielding permanent magnet circuits. The circuit of FIG. 3 is especially suited for voltage tunable magnetrons but is less advantageous than the magnetron circuit of FIG. 1 due to a greater perturbation of the field in the gap by the temperature compensating shunts.

More particularly, the magnetic circuit of FIG. 3 is identical with that of FIG. 1, like numerals being used for like parts, except that the temperature compensating shunt member 6 of FIG. 1 is replaced by a pair of shunting plates 18 transversely carried at the mutually opposed ends of the permanent magnets 2 and 3 and interconnecting at their peripheries with the cylindrical yoke 5.

As in the previous magnetic circuits of FIGS. 1 and 2, the plates 18 are made of Carpenter's 30 type II alloy. In operation, as the magnetic circuit warms up, losing magnetomotive force, the plates 18 lose magnetic permeability causing less of the flux in the gap 4 to be shunted to the yoke 5 thereby maintaining a nearly constant magnetic field intensity in the gap 4.

Referring now to FIG. 4 there is shown a longitudinal view, partly in section, of a magnetic circuit of FIG. 1 with the voltage tunable magnetron in place and showing the constructional details of the magnetic circuit. More specifically, a block of soft iron 21 is provided with a cylindrical bore 22 which is internally threaded at 23 and 24 from both ends of the bore toward the center. A pair of externally threaded sleeves 25 and 26 as of soft iron or steel are closed at their outer ends by a pair of circular end plates 27 and 28 as of soft iron or steel welded to the sleeves 25 and 26 thereby forming a pair of cup-shaped subassembly structures.

A pair of frustro-conical aiding polarized permanent magnets 29 and 31 as of platinum-cobalt are fixedly secured to the end plates 27 and 28 of the cup-shaped subassemblies and project axially into the bore 22 from the ends thereof. One magnet 31 is larger than the other to give a tapered magnetic field in the gap as shown in FIG. 5. A temperature compensating ring 32 of Carpenter's steel 30 type II having a wedge shape cross section fits around the larger magnet 31 and mates at its internal surface with the outer conical surface of the magnet 31 and at its outer surface with the inside surface of the sleeve 26. A threaded retaining ring 33 as of nonmagnetic stainless steel is threaded into the inner end of the sleeve 26 and is tightened down against the temperature compensating ring 32 to provide a tight solid assembly wherein the larger magnet 31 is rigidly held in firm contact with both the end plate 28 and thermal compensating ring 32 which in turn is held in firm intimate contact with the soft iron sleeve 26. In this manner good thermal contact is assured between the magnet 31, compensating ring 32 and the surrounding soft iron yoke whereby thermal gradients are minimized while at the same time providing a rigid non-microphonic rugged magnetic circuit.

A conventional voltage tunable magnetron 34 is located in the gap 35 between the opposed ends of the magnets in a manner similar to that shown and described in applicant's copending application U.S. Ser. No. 458,617 filed May 25, 1965, and assigned to the same assignee as the present invention.

The compensating effect of the temperature compensating ring 32 upon the performance of the voltage tunable magnetron 34 is shown in FIG. 6 wherein frequency drift in mc./sec. is plotted against operating temperature in degrees centrigrade. The line plotted for the uncompensated tube, i.e., no temperature compensating ring 32, shows a substantial frequency drift of 105 mc. over a temperature range of 64° C., whereas the same tube with a temperature compensating ring 32 shows a total frequency drift of only 11 mc. over the same range of temperature.

It has been found that enhanced results are obtained if the temperature compensating ring 32 of FIG. 4 is placed only around the larger magnet 31. The magnetron's output performance i.e., noise and voltage tuning linearity is very sensitive to the field shape (constant H region) produced by the small magnet 29 and relatively insensitive to the flared shape of the field due to the large magnet. Therefore, locating the temperature compensating ring 32 only around the larger magnet 31 causes the tube's performance to be less affected by the field changes with temperature due to the compensator 32.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A temperature compensated magnetic circuit including, means forming a pair of axially aligned spaced apart aiding polarized permanent magnets characterized by a decreasing magnetization with increasing temperature, said magnets defining a magnetic gap between a pair of their near poles of opposite polarity and defining a pair of remote poles of opposite polarity, means forming a magnetic permeable yoke substantially enclosing said magnet means and disposed to provide a flux return path between said pair of remote poles of said magnet means and to shield said gap from stray fields produced externally of said yoke, means forming a temperature compensating magnetic shunt having a coefficient of magnetic permeability which decreases with increasing temperature disposed to shunt a decreasing fraction of the magnetic flux produced by said magnet means away from said gap with increasing temperature of said magnet means, whereby the magnetic flux intensity in the gap of the magnet is rendered more constant over a certain range of operating temperature.

2. The apparatus according to claim 1 wherein said temperature compensating shunt means comprises a ring of temperature compensating material encircling at least one of said aligned magnets of said pair of magnet means.

3. The apparatus according to claim 2 wherein said ring has an axial length which is axially coextensive with a preponderance of the axial length of one of said magnets of said pair of magnet means.

4. The apparatus according to claim 3 wherein said ring substantially fills the annular region of space between said encircled magnet and said enclosing magnetic yoke for shunting the fraction of flux of the magnet to the yoke.

5. The apparatus according to claim 4 wherein said encircled magnet is of a truncated cone shape and said ring is of wedge shape in cross section.

6. The apparatus according to claim 2 wherein one of said magnets of said pair of magnets is larger than the other magnet of said pair of magnet means to provide a flared field intensity in said gap, means forming a voltage tunable magnetron having an electron emitter electrode therein, said magnetron disposed in said gap of the magnetic circuit with the emitter of said magnetron disposed nearer to said larger magnet than said smaller magnet, and said temperature compensating ring means encircling only said larger magnet whereby the output signal performance of said magnetron is rendered less responsive to changes in the shape of the magnetic field produced by said temperature compensating ring.

7. The apparatus according to claim 5 wherein said yoke means comprises a member of magnetic permeable material having a bore therethrough in axial alignment with said pair of aligned magnet means, said bore having an internally threaded end portion, and at least one magnet of said pair of magnets being carried within an externally threaded cup-shaped structure of magnetic permeable material, said cup structure being threaded into and serving to close off one end of said threaded bore in said yoke member.

8. The apparatus of claim 7 wherein said bored member of magnetic permeable material is a block of soft iron.

9. The apparatus of claim 1 wherein said temperature compensating shunt means includes a pair of plates made of temperature compensating material disposed transverse to the axes of said axially aligned magnets with each plate being disposed on opposite sides of and within said gap of the magnetic circuit.

10. The apparatus according to claim 5 wherein said magnets are made of platinum-cobalt.

References Cited

UNITED STATES PATENTS 3,009,084  11/1961  Balliett _____ 335—217
3,126,518  3/1964   Johannson.

BERNARD A. GILHEANY, *Primary Examiner.*

G. HARRIS, *Assistant Examiner.*